US005724045A

United States Patent [19]

Kawakami

[11] Patent Number: 5,724,045

[45] Date of Patent: Mar. 3, 1998

[54] RADAR TRANSPONDER

[75] Inventor: Youichi Kawakami, Hyogo, Japan

[73] Assignee: Mitsubishi Denki Kabushiki Kaisha, Tokyo, Japan

[21] Appl. No.: 531,072

[22] Filed: Sep. 20, 1995

[30] Foreign Application Priority Data

Sep. 22, 1994 [JP] Japan .................................... 6-228050

[51] Int. Cl.$^6$ .............................. H04B 7/185; G01S 5/02

[52] U.S. Cl. ........................ 342/357; 364/449.7; 343/882

[58] Field of Search ......................... 342/357; 364/449.7; 343/881, 882

[56] References Cited

U.S. PATENT DOCUMENTS

| | | | |
|---|---|---|---|
| 4,129,868 | 12/1978 | Tahara et al. . | |
| 4,885,588 | 12/1989 | Kawakami . | |
| 4,980,689 | 12/1990 | Kawakami . | |
| 5,177,493 | 1/1993 | Kawamura | 343/879 |
| 5,523,761 | 6/1996 | Gildea | 342/357 |

OTHER PUBLICATIONS

W. Goebel, "Seenotruf nutzt Superpositionsprinzip", Satellitenfunk, In. Ntz, 1991 Ed. 44, No. 5, pp. 332–336.

*Primary Examiner*—Theodore M. Blum
*Attorney, Agent, or Firm*—Rothwell, Figg, Ernst & Kurz

[57] ABSTRACT

A multi-functional radar transponder functions as SART in an emergency condition and as monitor, GPS receiver and VHF transceiver for non-emergency conditions. The radar transponder has an antenna including a SART antenna, a GPS antenna and a Marine VHF antenna. The radar transponder further includes a SART circuit with a monitor output device for monitoring a radar signal, and transfer switches for transferring a monitor process in a normal mode to a responding process in an emergency mode, and vice versa. The GPS antenna closes to a position parallel to the SART antenna in the normal mode and opens vertically against the SART antenna in the emergency mode. The Marine VHF antenna locks the GPS antenna together with the SART antenna for preventing a false emergency response in the normal mode and unlocks the SART antenna for an emergency response in the emergency mode.

12 Claims, 7 Drawing Sheets

RADAR TRANSPONDER

BACKGROUND OF THE INVENTION

1. Field of the Invention

The present invention relates to radar transponders and, more specifically, to search and rescue radar transponders, SART, which are applicable to a salvage or search and rescue system such as the Global Maritime Distress and Safety System, GMDSS.

2. Description of the Conventional Art

FIG. 7 illustrates an overall search and rescue GMDSS system involving a conventional SART 6, which any SOLAS (Safety of Life at Sea), convention ships over 300 tons are required to carry as mandatory equipment. FIG. 6 shows a circuitry of the conventional SART 6 with respect to which the IMO, the International Maritime Organization, and the CCIR, the International Radio Consultative Committee, prescribe the requirements for on-board performance.

FIG. 7 diagrams an emergency operation of the search and rescue system of GMDSS with a ship in distress carrying the conventional SART 6 and an Emergency Position Indicating Radio Beacon, EPIRB, 1. In the event of a shipwreck, the distress information is spontaneously reported to a polar orbital COSPAS/SARSAT satellite 2 and/or a stationary INMARSAT satellite 3 via the EPIRB 1. The distress information is then transferred to a nearby COSPAS/SARSAT ground station (CRS) 4*a* and/or a nearby INMARSAT ground station (LUT) 4*b* via the satellites. The ground stations report the distress to a salvage station 5. Upon reception of the distress report, the salvage station 5 immediately sends an emergency request for search and rescue of the reported ship in distress to salvage boats as well as vessels sailing nearby. A search and rescue request is sent to a different nautical zone via a signal of different radio wave or frequency depending on the relation of location and distance between the reported ship in distress and the salvage station 5. A VHF radio wave signal W1 transfers the request to a vessel 100*a* a short distance away in a nautical zone A1 between 25 and 100 miles from the salvage station 5. A MF radio wave signal W2 or W4 transfers the signal to a vessel 100*b* or a salvage boat 100*d* in FIG. 1 in a nautical zone A2 over 100 miles from the salvage station 5. When a vessel 100*c* is located in a higher latitude over 70 degrees north/south in a nautical zone A3 in the case of the salvage station 5 located in Japan, for instance, a MF/HF radio wave signal W3 is employed to send the request. Upon reception of the search and rescue request, the salvage boat 100*d* or/and any one of the vessels 100*a*, 100*b*, and 100*c* starts a radar search for the reported ship in distress.

Upon reception of a search radar signal, the SART 6 of the reported ship in distress responds to the search radar by transmitting a sweep frequency radio wave signal in a frequency range between 9.2 GHz and 9.5 GHz in synchronization with the transmission pulses of the search radar. The response signal code of distress informations from the SART 6 is indicated on a PPI (Plan-Position Indicator) screen of the search radar in the form of a series of twelve dots including the direction, distance and distress informations of the SART 6 or the reported ship in distress. Thus, a prompt and effective rescue operation is performed via the SART 6 in the search and rescue system of GMDSS.

FIG. 6 details the circuitry of the conventional SART 6 with an antenna 11 functioning as a receiving antenna and a transmitting antenna 20 of the figure.

Referring to the circuitry, upon reception of a radio wave signal of search radar at the receiving antenna 11, a Field Effect Transistor, (FET) amplifier 12 amplifies the signal. The amplified signal is detected in a direct diode detector 13 and then passes through a further amplification in a video amplifier 14 followed by another trigger-level amplification in an auxiliary video amplifier 15.

The trigger-level amplified signal becomes a trigger in a control circuit 16 for opening a transmission gate in a transmission gate circuit 17. The trigger output through the transmission gate is delivered separately to a sweep signal generator 18, a microwave oscillator 19 and a receiving/transmitting transfer switch 21. The trigger starts generating a sweep signal to sweep signals of a predetermined band in a range of 9.2 GHz and 9.5 GHz. The trigger starts microwave oscillation in the microwave oscillator 19. The trigger switches the FET amplifier 12 to suppress the receiving antenna 11 in the receiving/transmitting transfer switch 21. Consequently, the microwave oscillation is swept by a generated sweep signal and transmitted from the transmitting antenna 20 as an emergency response of rescue request.

Thus, the conventional SART 6 is designed only for an emergency use with a ship in distress receiving a radio wave signal of a search radar and transmitting a response of emergency rescue request to the radar. It is thus a challenge to make expanded use of such a radar transponder not only in an emergency but also in cases other than an emergency. The conventional SART 6 has no check function by monitoring its performance for emergency. In this respect, the conventional SART 6 leaves ample room for improvement in multi-purpose radar transponder.

Accordingly, one object of the present invention is to provide a multi-purpose radar transponder which works not only in an emergency as an SART in distress but also under other than emergency conditions. The inventive SART may be used to monitor radar signals unless there is an emergency to indicate radar-operating vessels approaching near by, which can avoid a possible danger of collision. This also acts as the check function as stated above. The inventive SART has an additional advantage of encouragement to persons on a ship in distress through communications with the outer world by means of the GPS receiver for collecting position information from the GPS satellite and the Marine VHF transceiver for making VHF contact with a vessel or a ground station.

SUMMARY OF THE INVENTION

This and other objects are accomplished by the following aspects of the present invention.

According to one aspect of the present invention, a multi-functional radar transponder having a Global Positioning System (GPS) receiver and equipped for being mounted in a ship comprises means for monitoring radar signals from other ships in a normal mode and for receiving and transmitting marine disaster signals in an emergency mode; a multi-functional antenna structure comprising a first antenna for receiving the radar signals form other ships in the normal mode and for receiving and transmitting marine disaster signals in the emergency mode and a second antenna for receiving GPS signals mounted to be positioned adjacent to and to be folded out to a position extending at an angle of about 90 degrees to the first antenna in the emergency mode; and a first switch operated with the positioning of the second antenna from the normal mode to the emergency mode for disenabling the transmission of the marine disaster signals in the normal mode and for enabling the transmission of the marine disaster signals in the emergency mode.

According to another aspect of the present invention, a multi-functional radar transponder having a Global Positioning System (GPS) receiver and equipped for being mounted in a ship comprises a multi-functional antenna structure comprising a first antenna for monitoring radar signals from other ships in a normal mode and for receiving and transmitting marine disaster signals in an emergency mode a second antenna for receiving GPS signals mounted to be positioned adjacent to and parallel with the first antenna in the normal mode and to be folded out at an angle of about 90 degrees to the first antenna in the emergency mode; and a switch operated by the folding out of the second antenna to the emergency mode for preventing power from being supplied to the radar transponder in the normal mode and for supplying power to the radar transponder in the emergency mode.

According to another aspect of the present invention, a method of operating a multi-functional radar transponder and Global Positioning System (GPS) receiver operable in normal and emergency modes and having a first antenna operable with the radar transponder and capable of receiving GPS signals foldable between positions against and away from the first antenna, and a switch operable with the folding of the second antenna between the positions for selecting one of a radar monitoring and a transmitting marine disaster signal function, the method comprises the steps of positioning the second antenna in a horizontal position substantially parallel to the earth's surface and receiving GPS signals from the vertical direction in a normal mode and positioning the first antenna in a vertical position substantially perpendicular to the earth's surface and monitoring radar signals from other ships also in a normal mode.

According to another aspect of the present invention, a method of operating a multi-functional radar transponder and Global Positioning System (GPS) receiver operable in normal and emergency modes and having a first antenna operable with the radar transponder and capable of receiving GPS signals foldable between positions against and away from the first antenna, and a switch operable with the folding of the second antenna between the positions for selecting one of a radar monitoring and a transmitting marine disaster signal function, the method comprises the steps of folding up the second antenna at an angle of about 90 degrees against to the first antenna for selecting transmitting marine disaster signal in emergency mode; receiving GPS signal by the second antenna in emergency mode if needed, wherein the first antenna is set horizontally; and receiving and transmitting marine disaster signal by the first antenna set horizontally in emergency mode.

DESCRIPTION OF THE PREFERRED EMBODIMENTS

Embodiment 1

Figure 1:
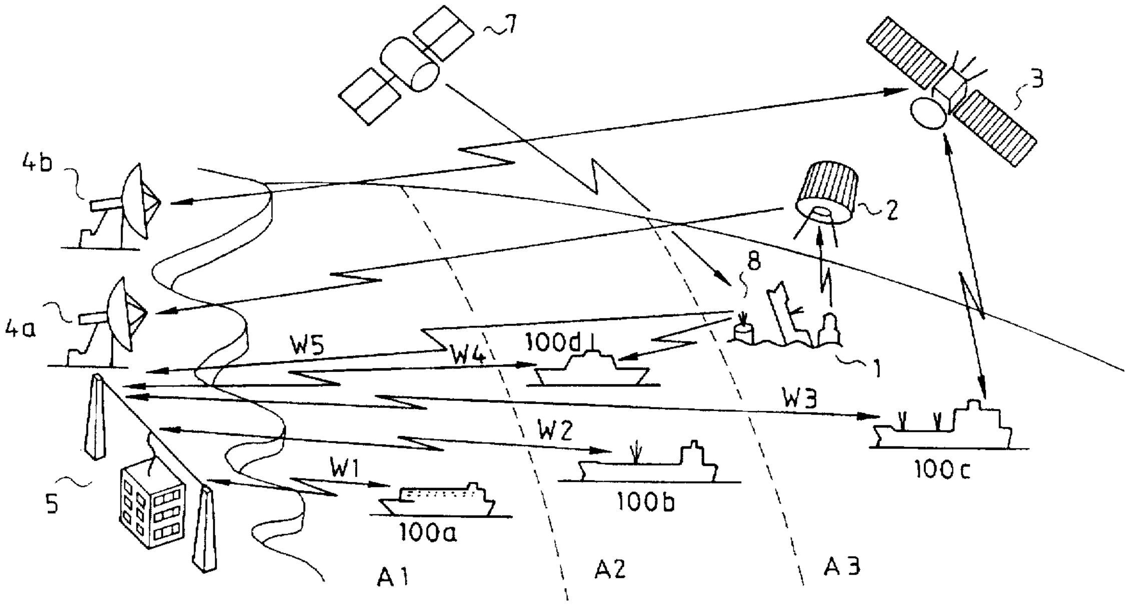
FIG. 1 illustrates an overall safety system involving an SART 8 according to the present invention.
Figure 7:
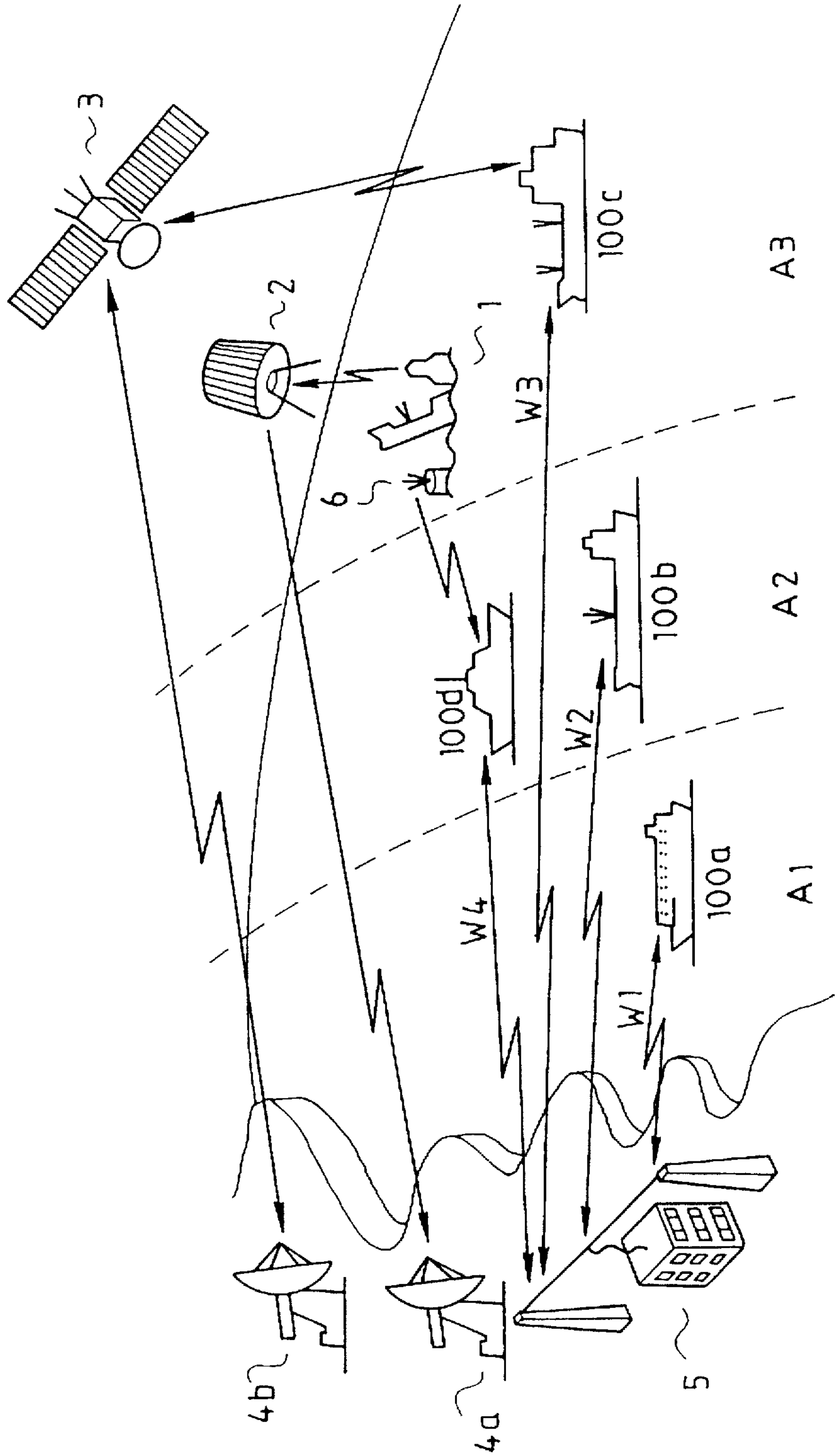
Fig.7 CONVENTIONAL ART
FIG. 7 illustrates an overall search and rescue system of GMDSS involving the conventional SART 6.

The present invention attains the foregoing and other objects by providing, in one embodiment thereof, a multi-functional radar transponder which closes to stay parallel in normal mode and opens to vertical position in emergency mode. FIG. 1 illustrates an overall safety system involving an SART 8 according to the present invention. The embodiment of FIG. 1 modifies the conventional art of FIG. 7 with the replacement of the inventive SART 8 for the conventional SART 6 and with an additional Global Positioning System (GPS) satellite 7. The other items designated by the same reference numerals in FIG. 1 and in FIG. 7 are the same as or correspond to those of FIG. 7.

One of the advantageous features of the present invention is that the SART 8 monitors an incoming signal of a radar-operating vessel sailing under other than emergency conditions. The monitoring function contributes greatly to securing the receiving function of the SART as a tool for both a normal response and in case of emergency. As another advantageous feature of the SART 8, a GPS receiver is included for collecting position information from the GPS satellite 7 under other than emergency conditions. The SART 8 also adds a Marine VHF transceiver for making a VHF radio contact, W5, of FIG. 1, with a ground station or a vessel sailing near by.

Figure 2:
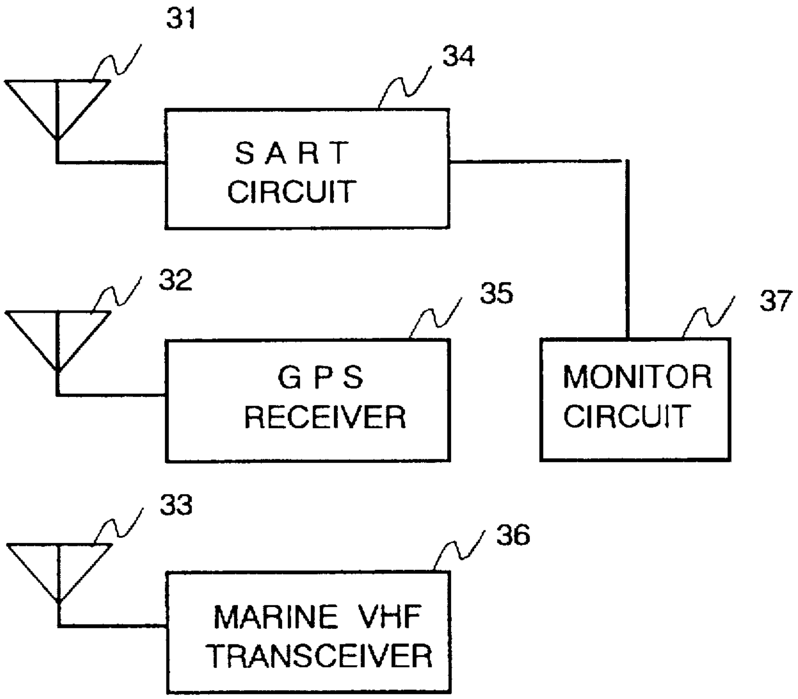
FIG. 2 shows a conceptual diagram illustrating the functional idea of the SART of FIG. 1.

FIG. 2 shows a conceptual diagram illustrating the functional aspects of the inventive SART 8 of FIG. 1 including the communication devices and antennas. The inventive SART 8 houses an inventive SART circuit 34 including a monitor circuit 37 with a SART antenna 31, a GPS receiver 35 with a GPS antenna 32 and a Marine VHF transceiver 36 with a Marine VHF antenna 33. Each of the communication devices operates separately in the housing of the SART 8 using its corresponding antenna.

Figure 3:
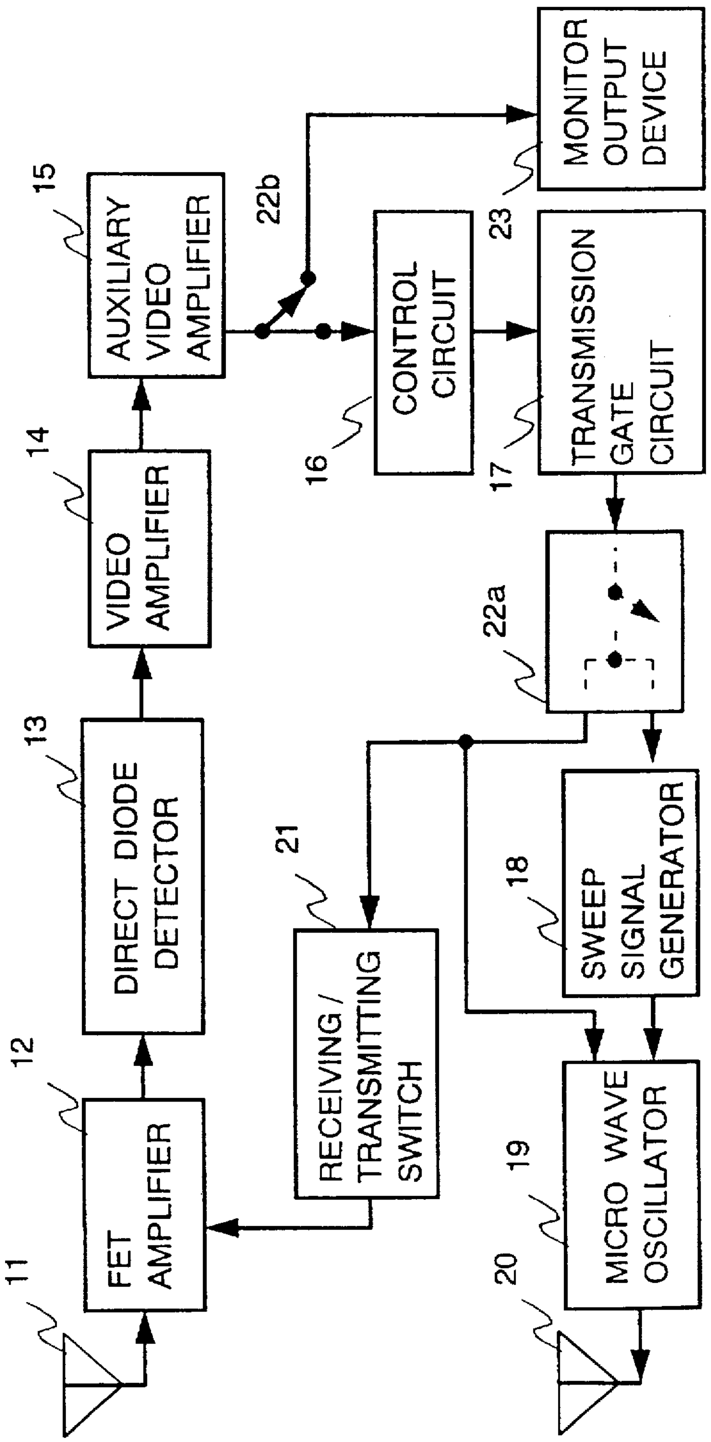
FIG. 3 shows the circuitry of the SART circuit 34 of FIG. 2.

FIG. 3 shows the circuitry of the SART circuit 34 of FIG. 2. The inventive circuitry of FIG. 3 modifies the conventional circuitry of FIG. 8 with additional transfer switches of a response transfer switch 22*a* and a monitor transfer switch 22*b* and a monitor output device 23. The other elements of FIG. 3 work identically to those of FIG. 6 with the same reference numerals designating the same elements as those of FIG. 3.

Figure 6:
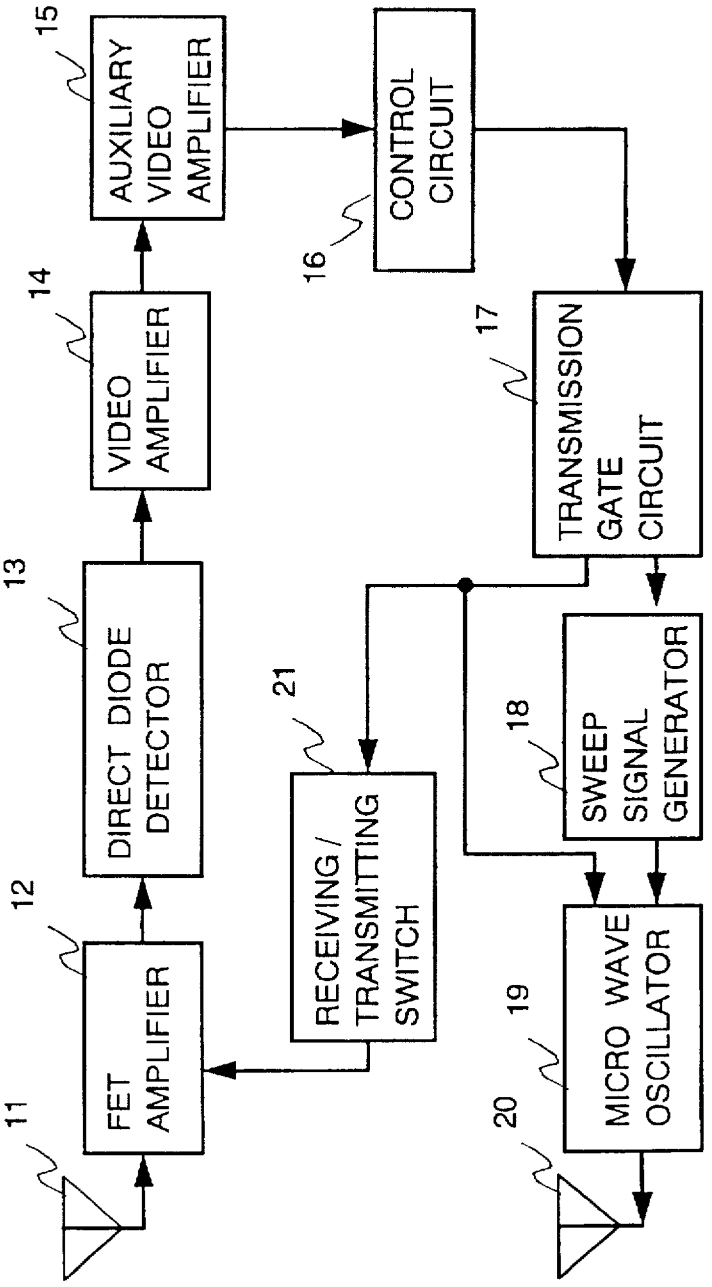
Fig.6 CONVENTIONAL ART
FIG. 6 shows a circuitry of a conventional SART 6.

The inventive SART 8 with the inventive SART circuit 34 includes an emergency response process similar to that performed in the conventional SART circuit of FIG. 6 in an emergency or response mode and a monitoring process via the monitor transfer switch 22*b* with the emergency response process suppressed in a suppress or normal mode unless an emergency exists.

As regards the emergency response process according to this embodiment, the transfer switches 22*a* and 22*b* are set to connect the transmission lines in the circuit for an emergency response in a manner which will be later explained. After being processed through a series of amplifications through the auxiliary video amplifier 15, the received incoming radio wave signal received at antenna 11 is transferred to the control circuit 16 via the monitor transfer switch 22*b*. Upon reception of the amplified signal, the control circuit 16 outputs a trigger for opening a transmission gate in the transmission gate circuit 17. The trigger passed through the transmission gate is delivered separately to the sweep signal generator 18, the microwave oscillator 19 and the receiving/transmitting transfer switch 21 via the response transfer switch 22*a* which connects the lines in the circuit. Consequently, a microwave swept signal is output by the microwave oscillator 19 to the transmission antenna 20, whereby a response signal or a marine disaster signal is transmitted while the receiving function of the receiving antenna 11 is suppressed in a manner which will be later explained. Thus, an emergency rescue request is transmitted in response to a search radar signal in the emergency mode.

As regards the monitoring process in other than an emergency condition with reference to FIG. 3, the transfer switches 22*a* and 22*b* are operated to disconnect the transmission lines from the circuit. After being processed through a series of amplifications through the auxiliary video amplifier 15, an incoming or received radio wave signal received at antenna 11 is transferred to the monitor output device 23 via the monitor transfer switch 22*b*. In the meantime, the response transfer switch 22*a* is set to disconnect the transmission line from the transmission gate circuit 17 and from the elements downstream thereof which operate in the emergency response mode. This prevents a marine disaster signal from being transmitted from the transmission antenna 20 and suppresses any false emergency response unless the system is set in an emergency mode. The monitor output device 23 monitors the incoming or received signal and outputs the same by suitable output means. Warning sounds, sound from a speaker, or a light of lamp may be employed, for example, as appropriate and simple output means for the monitor output device 23.

Thus, the SART 8 monitors incoming radar signals unless there is an emergency indicating approach of vessel by using a warning sound from a speaker, for example. When receiving a variety of radar signals with two or more radar-operating vessels approaching near by, the SART 8 makes a variety of tones or sounds reporting a possible danger of collision.

Figure 4A:
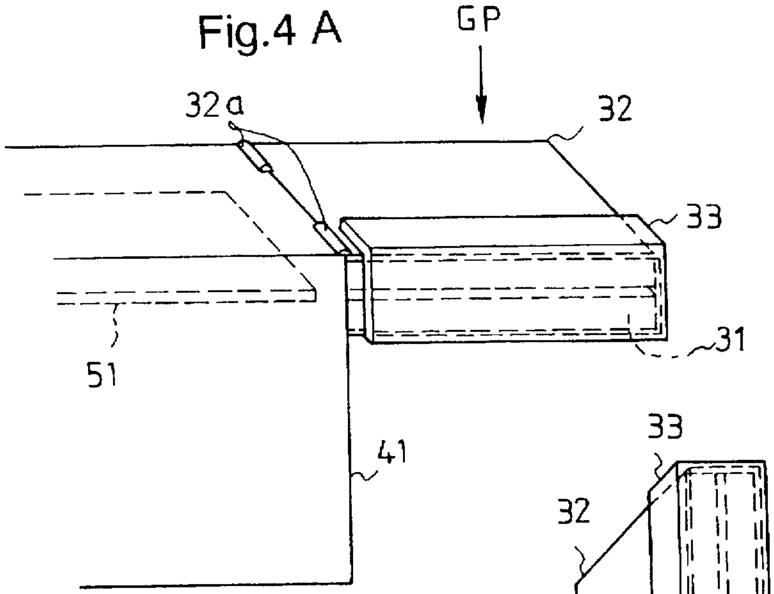
FIG. 4A is a partial structural diagram of the SART 8 of FIG. 1 illustrating an antenna complex including a Marine VHF antenna 33 in a locking position and a GPS antenna 32 in a locked position set horizontally to the sea surface in the normal mode unless an emergency exists.
Figure 4B:
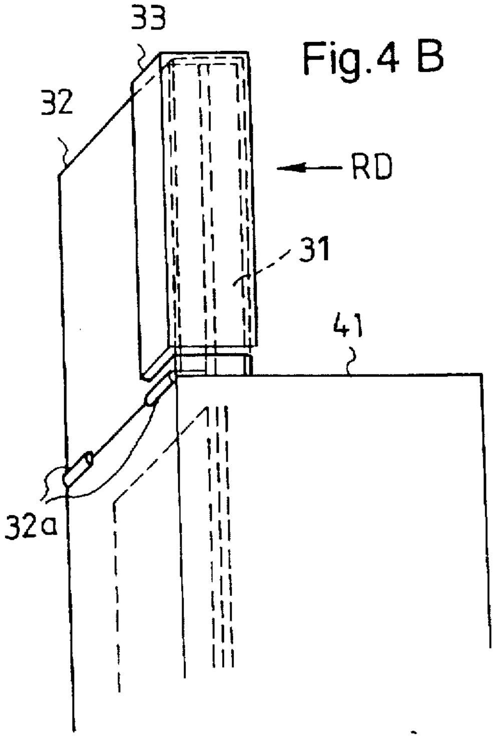
FIG. 4B is the partial structural diagram of the SART 8 of FIG. 1 illustrating the antenna complex of FIG. 4A with the GPS antenna 32 in the locked or held position and the Marine VHF antenna 33 in the locking holding position with a SART antenna 31 set vertically to the sea surface also in the normal mode unless an emergency exists.
Figure 4C:
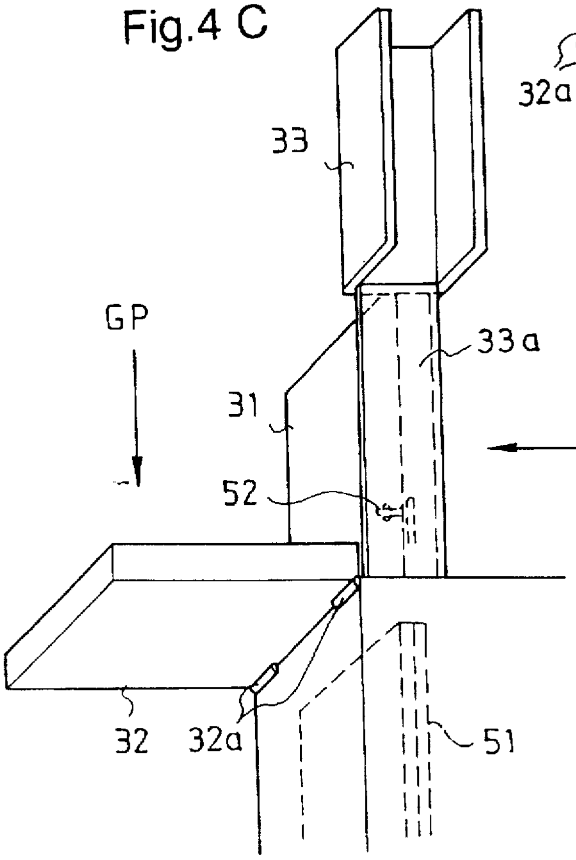
FIG. 4C is a partial structural diagram of the SART of FIG. 1 illustrating the antenna complex of FIG. 4A with the Marine VHF antenna 33 in an unlocking position, the GPS antenna 32 in an unlocked position and the SART antenna 31 set vertically to the sea surface in the emergency mode.

FIG. 4A through 4C show partial structural diagrams of the SART 8 of FIG. 1 illustrating an antenna complex and part of a housing 41. The antenna complex including the SART antenna 31, the GPS antenna 32 and the Marine VHF antenna 33 of FIG. 2 is fixed at a side edge of the housing 41. The housing 41 contains the SART circuit 34, the GPS receiver 35 and the Marine VHF transceiver 36 of FIG. 2 on a multilayered board 51. The SART antenna 31 is fixed on the housing 41 as an immovable base antenna. The GPS antenna 32 is a flexible antenna with one side hinged, or supported with a flexible supporting element such as a hinge 32*a*, on the housing 41. The GPS antenna 32 closes to stay in parallel to the SART antenna 31 in a shielding manner in the suppress or normal mode and opens or folds out to stay vertically or at an angle of 90 degrees against the SART antenna 31 in an exposing manner in the response or emergency mode. The Marine VHF antenna 33 is a strip of folding antenna with one end fixed on the side edge of the housing 41. The folding antenna folds halfway in or out on hinges, for example, or a flexible supporting device mounted on a support portion 33*a* of the antenna 33. An open half end of the folding antenna is U-shaped as shown for locking or holding the GPS antenna 32 together with the SART antenna 31 when folded in as shown in FIGS. 4A and 4B.

A micro-switch 52, which operates as a transfer switch, as shown in FIG. 4C is provided on a GPS antenna side of the SART antenna 31 so that the transfer switch 52 is operated as the flexible GPS antenna 32 moves against or away from SART antenna 31. The micro-switch 52 interlocks to operate the response transfer switch 22*a* and the monitor transfer switch 22*b* in the SART circuit 34 of FIG. 3 as will later be explained in further detail.

The antenna complex according to this embodiment is devised to prevent the SART 8 from transmitting a false emergency response unless there is an emergency while monitoring, for example, since the emergency functions of SART require careful and cautious operation and should not be misused. In this respect, the GPS antenna 32 closes in a shielding manner against the SART antenna 31 as shown in FIGS. 4A and 4B and prevents a false emergency response from being transmitted from the SART antenna 31 by mistake. When the GPS antenna 32 is in the locked or held position touching the micro-switch 52 in the normal mode, the interlocking response and monitor transfer switches 22*a* and 22*b* are automatically set to disconnect the transmission lines for emergency response in the SART circuit 34. This further prevents against a false emergency response. The Marine VHF antenna 33, while in a locking or holding position as shown in FIGS. 4A and 4B, still further secures against false operations by locking the GPS antenna together with the SART antenna 31.

Another advantageous feature of the antenna complex of the present invention is that the GPS antenna 32 receives radio waves GP from the Global Positioning System Satellite 7 of FIG. 1 at an optimal angle with a vertical signal from the sky when the antenna is set horizontally and parallel to the sea surface as shown in FIG. 4A. The SART antenna 31 receives radio waves RD coming horizontally to the sea surface from a radar vessel sailing near by at an optimal angle with a horizontal signal when the antenna is set vertically to the sea surface as shown in FIG. 4B. The SART antenna 31 monitors an approach of a vessel in every direction of the surroundings when the antenna complex is rotated through 380 degrees with the Marine VHF antenna 33 as the axis.

FIG. 4C illustrates the antenna complex in an emergency mode in distress for an emergency response with the GPS antenna 32 opened to be perpendicular to the SART antenna 31 in an unlocked or freed position. The Marine VHF antenna 33 hinges open to an unlocking position as shown in FIG. 4C to unlock or free the GPS antenna 32 to permit movement to the unlocked or freed position. This gives the SART antenna 31 an unshielded and improved sensitivity for effective and efficient receiving performance of radio wave signals from a search radar. The Marine VHF antenna 33 in the unlocking position also gains improved sensitivity for VHF contact with a vessel because of its broader receiving space and higher receiving position. When the GPS antenna 33 is unlocked or set free to separate from contact with the microswitch 52, the interlocking response operates monitor transfer switches 22*a* and 22*b* in the SART circuit 34 to connect the transmission lines in the circuit for an emergency response in the emergency mode as explained above. Thus, the antenna complex provides an optimal antenna environment for antenna performance and gain in the safety system of FIG. 1 for each of the antennas of communication devices. The housing 41 can be positioned either with a horizontally extending antenna 32 as shown in FIG. 4A or with a vertically extending antenna 32 as shown in FIG. 4B.

The SART of the present invention provides an additional advantage of encouragement to persons on a ship in distress through communications with the outer world by means of the GPS receiver for collecting position information from the GPS satellite and the Marine VHF transceiver for making VHF contact with a vessel or a ground station.

Embodiment 2

Figure 5A:
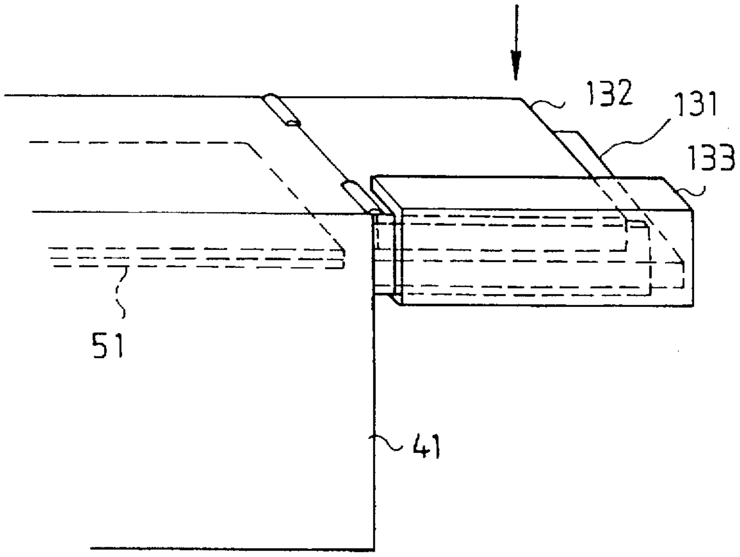
FIG. 5A is a partial structural diagram of an SART illustrating another antenna complex according to another embodiment of the present invention in the normal mode with emergency functions suppressed.
Figure 5B:
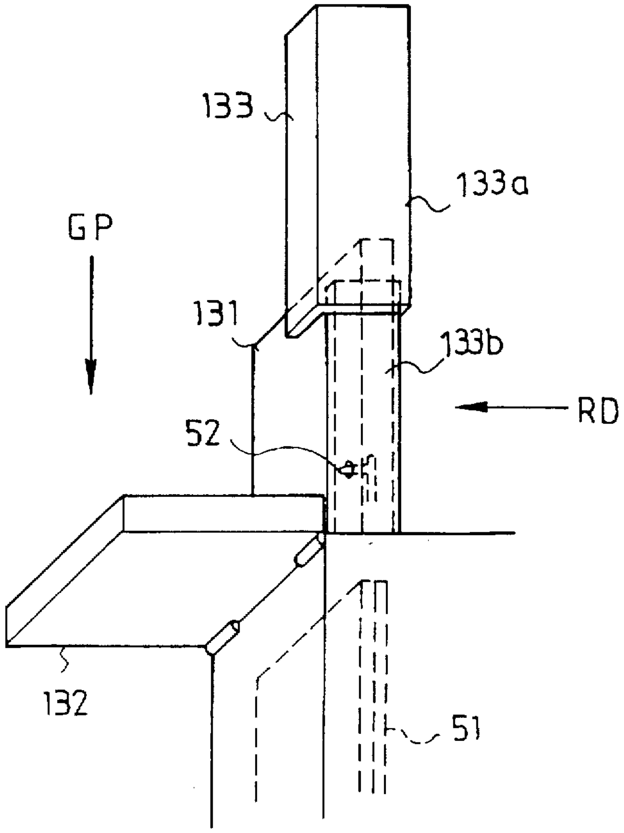
FIG. 5B is a partial structural diagram of the SART illustrating the antenna complex of FIG. 5A in the emergency mode.

FIGS. 5A and 5B show partial structural diagrams of an SART according to another embodiment of the present invention illustrating an antenna complex and part of the housing 41. The antenna complex of this embodiment includes a SART antenna 131, a GPS antenna 132 and a Marine VHF antenna 133. The SART antenna 131 is an immovable base antenna fixed to a side edge of the housing 41 of the SART. The Marine VHF antenna 133 is an extendable antenna which can be extended in a sliding manner or can be a sliding antenna with a movable U-shaped open half end 133*a* and an immovable half 133*b* fixed on one side edge of the housing 41. The GPS antenna 132 is a flexible antenna with one side hinged, for example, on the side edge of the housing 41, and is made slightly shorter in the dimension extending away from housing 41 than that of the Marine VHF antenna 133 as shown more clearly in FIG. 5A.

FIG. 5A shows the antenna complex in the normal mode with emergency functions suppressed with the Marine VHF antenna 133 in a locking or holding position and the GPS antenna 132 closed in a locked or held position parallel to the SART antenna 131 set horizontally and parallel to the sea surface. FIG. 5B shows the antenna complex in the response or emergency mode with the Marine VHF antenna 133 in an unlocking or freeing extended position and the GPS antenna 132 open in an unlocked or freed position at a right angle to the SART antenna 131 which is set vertically and perpendicular to the sea surface. As the Marine VHF antenna 133 slides and is extended in length toward the unlocking or freeing position, the shorter GPS antenna 132 becomes unlocked or freed to fold out and expose the SART antenna 131 in the position shown in FIG. 5B.

Embodiment 3

In a third embodiment, the GPS antenna 31 of FIGS. 4A through 4C or 132 of FIGS. 5A and 5B is hinged in a firm or high friction manner and is held by the stiffness of the hinge in a locked position against the SART antenna. In the antenna complex of an SART according to this embodiment, no locking or holding system is required for the GPS antenna by a Marine VHF antenna for protection against a false emergency response since the GPS antenna stays in position firmly enough to lock itself.

Embodiment 4

A SART circuit according to a fourth embodiment requires the response transfer switch 22*a* and no monitor transfer switch 22*b* of FIG. 3 interlocking with the micro-switch 52 of FIG. 4. In this case, a transmission line forks and connects the auxiliary video amplifier 15 both with the control circuit 16 and the monitor output device 23 without the monitor transfer switch 22*b*. The monitor output device 23, therefore, monitors a constant series of received signals both in an emergency mode in distress and unless an emergency in the normal mode.

Embodiment 5

A transfer switch for detecting the movement of the GPS antenna from/to the locked or held position to/from the unlocked or freed position may be replaced with an electromagnetic reed switch or a pair of infrared light-emitting diode and photo sensor for the micro-switch 52 of FIG. 4 interlocking the response and monitor transfer switches of FIG. 3.

Embodiment 6

The micro-switch 52 of FIG. 4 may interlock a power switch for supplying an electrical power or electricity to a SART circuit, which requires no response transfer switch 22*a* for protection against a false emergency response unless emergency in the normal mode. An SART in this case provides no monitoring. When the GPS antenna is separated from the micro-switch 52 to open or fold out in an emergency mode in distress, electricity is supplied to the SART circuit via the power switch for an emergency response.

Embodiment 7

A Marine VHF antenna may be supported at one end on another side edge of the housing on the same level as that of the GPS antenna 32 when folding out forming a right angle against the SART antenna 31.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A multi-functional radar transponder having a Global Positioning System (GPS) receiver and equipped for being mounted in a ship comprising:

means for monitoring radar signals from other ships in a normal mode and for receiving and transmitting marine disaster signals in an emergency mode;

a multi-functional antenna structure comprising:

a first antenna for receiving the radar signals from other ships in the normal mode and for receiving and transmitting marine disaster signals in the emergency mode; and a second antenna for receiving GPS signals mounted to be positioned adjacent to and to be folded out to a position extending at an angle of about 90 degrees to the first antenna in the emergency mode; and a first switch operated with the positioning of the second antenna from the normal mode to the emergency mode for disenabling the transmission of the marine disaster signals in the normal mode and for enabling the transmission of the marine disaster signals in the emergency mode.

2. The radar transponder according to claim 1, further comprising:

a VHF antenna movable between two positions for transmitting and receiving VHF radio signals, wherein the VHF antenna holds the second antenna together with the first antenna in a first of the two positions corresponding to the normal mode, and frees the second antenna in a second of the two positions corresponding to the emergency mode.

3. The radar transponder according to claim 2, wherein the VHF antenna includes a sliding structure for enabling sliding movement of the VHF antenna between the first and second positions.

4. The radar transponder according to claim 2, wherein the VHF antenna includes a folding structure for enabling folding movement of the VHF antenna between the first and second positions.

5. The radar transponder according to claim 1, further comprising:

a monitor operated by the first switch, for monitoring received signals from another ship through the first antenna in the normal mode.

6. The radar transponder according to claim 1, further comprising:

a monitor for monitoring received signals from another ship through the first antenna.

7. The radar transponder according to claim 5 or 6, wherein the monitor is a speaker.

8. The radar transponder according to claim 5, wherein the first switch is a micro-switch.

9. The radar transponder according to claim 5, wherein the first switch is a reed-switch.

10. A multi-functional radar transponder having a Global Positioning System (GPS) receiver and equipped for being mounted in a ship comprising:

a multi-functional antenna structure comprising:

a first antenna for monitoring radar signals from other ships in a normal mode and for receiving and transmitting marine disaster signals in an emergency mode;

a second antenna for receiving GPS signals mounted to be positioned adjacent to and parallel with the first antenna in the normal mode and to be folded out at an angle of about 90 degrees to the first antenna in the emergency mode; and a switch operated by the folding out of the second antenna to the emergency mode for preventing power from being supplied to the radar transponder in the normal mode and for supplying power to the radar transponder in the emergency mode.

11. A method of operating a multi-functional radar transponder and Global Positioning System (GPS) receiver operable in normal and emergency modes and having a first antenna operable with the radar transponder for receiving GPS signals in a normal mode, a second antenna foldable between positions against and away from the first antenna, said second antenna also for receiving GPS signals, and a switch operable with the folding of the second antenna between the positions for selecting one of a radar monitoring and a transmitting marine disaster signal function, comprising the steps of:

positioning the second antenna in a horizontal position substantially parallel to the earth's surface and receiving GPS signals from the vertical direction in a normal mode; and positioning the first antenna in a vertical position substantially perpendicular to the earth's surface and monitoring radar signals from other ships also in a normal mode.

12. A method of operating a multi-functional radar transponder and Global Positioning System (GPS) receiver operable in normal and emergency modes and having a first antenna operable with the radar transponder for receiving GPS signals in a normal mode, a second antenna foldable between positions against and away from the first antenna, said second antenna also for receiving GPS signals, and a switch operable with the folding of the second antenna between the positions for selecting one of a radar monitoring and a transmitting marine disaster signal function, comprising the steps of:

folding up the second antenna at an angle of about 90 degrees with respect to the first antenna for selecting said transmitting marine disaster signal function in an emergency mode;

receiving a GPS signal by the second antenna in emergency mode if needed, wherein the first antenna is set horizontally; and receiving and transmitting a marine disaster signal by the first antenna set horizontally in an emergency mode.

* * * * *